(12) United States Patent  (10) Patent No.: US 7,567,532 B2
Zimmerman et al.  (45) Date of Patent: Jul. 28, 2009

(54) METHOD AND SYSTEM FOR PACKING MANAGEMENT MESSAGES IN A COMMUNICATION SYSTEM

(76) Inventors: Ofer Zimmerman, Helmonit st 6/2, Modiin (IL) 71700; Brian Spinar, 10685 Wexford St. #7, San Diego, CA (US) 92131; Kenneth L. Stanwood, 2403 Montgomery Ave., Cardiff by the Sea, CA (US) 92007

( * ) Notice: Subject to any disclaimer, the term of this patent is extended or adjusted under 35 U.S.C. 154(b) by 207 days.

(21) Appl. No.: 11/512,667

(22) Filed: Aug. 29, 2006

(65) Prior Publication Data

US 2007/0110103 A1  May 17, 2007

Related U.S. Application Data

(63) Continuation of application No. 09/798,784, filed on Mar. 2, 2001.

(51) Int. Cl.
*H04W 4/00* (2009.01)
(52) U.S. Cl. ............... 370/329; 370/310.1; 455/453
(58) Field of Classification Search ......... 370/310.1, 370/329; 455/453
See application file for complete search history.

(56) References Cited

U.S. PATENT DOCUMENTS 3,949,404 A  4/1976 Fletcher et al.

(Continued)

OTHER PUBLICATIONS

"Air Interface for Fixed Broadband Wireless Access Systems," IEEE 802.16.1-00/01r4, Sep. 2000, 340 pages, New York, NY.

(Continued)

*Primary Examiner*—Jason E Mattis
(74) *Attorney, Agent, or Firm*—Schwabe, Williamson & Wyatt, P.C.

(57) ABSTRACT

A method and apparatus for packing management messages in a broadband wireless communication system. Management messages are sent across a link in packets addressed to a particular connection, where the address identifies messages which may be specially treated. Such special treatment may include recognition of an overall message conveyed in such packets as containing one or more implicit messages embedded within the overall message. Two methods are disclosed to efficiently convey such management messages. First, each packet of information sent across the link may include a message type identifier, in which case it need not be repeated in the payload of the packet, and a number of such messages may be sent within a packet. Second, a packet of information may contain mixed management messages, in which case the byte with the message type identifier should be included with each such message. In this case, an overall message may be constructed from individual management messages simply concatenated together. Using either method, the management messages are packed into packets so that messages in a first packet may be parsed and acted upon without a need for any subsequent packets which may be necessary to convey an entire message. This is accomplished by taking any message which will not fit in a first packet may be made to be ignored, such as by being replaced with a padding pattern. In this way, any subsequent packet will have management messages which begin at the start of the effective data payload. Padding may also be added before or after an end of message or trailer information which defines the end of an overall message.

15 Claims, 11 Drawing Sheets

U.S. PATENT DOCUMENTS

| | | | |
|---|---|---|---|
| 4,495,619 A | | 1/1985 | Acampora |
| 5,054,109 A | * | 10/1991 | Blackburn .................. 455/17 |
| 5,297,144 A | | 3/1994 | Gilbert et al. |
| 5,420,851 A | | 5/1995 | Seshadri et al. |
| 5,444,698 A | | 8/1995 | Kito |
| 5,511,082 A | | 4/1996 | How et al. |
| 5,594,738 A | | 1/1997 | Crisler et al. |
| 5,615,212 A | | 3/1997 | Ruszczyk et al. |
| 5,633,868 A | | 5/1997 | Baldwin et al. |
| 5,638,371 A | | 6/1997 | Raychaudhuri et al. |
| 5,638,374 A | | 6/1997 | Heath |
| 5,675,573 A | | 10/1997 | Karol et al. |
| 5,751,708 A | | 5/1998 | Eng et al. |
| 5,768,254 A | | 6/1998 | Papadopoulos et al. |
| 5,828,695 A | | 10/1998 | Webb |
| 5,859,619 A | | 1/1999 | Wu et al. |
| 5,890,055 A | | 3/1999 | Chu et al. |
| 6,006,069 A | | 12/1999 | Langston |
| 6,016,311 A | | 1/2000 | Gilbert et al. |
| 6,016,313 A | | 1/2000 | Foster et al. |
| 6,038,455 A | | 3/2000 | Gardner et al. |
| 6,094,421 A | | 7/2000 | Scott |
| 6,112,080 A | | 8/2000 | Anderson et al. |
| 6,493,342 B1 | | 12/2002 | Breslow et al. |
| 6,760,303 B1 | * | 7/2004 | Brouwer .................. 370/229 |
| 6,804,251 B1 | | 10/2004 | Limb et al. |
| 6,985,455 B1 | | 1/2006 | Heath et al. |
| 2002/0067706 A1 | | 6/2002 | Bautz et al. |
| 2002/0141355 A1 | | 10/2002 | Struhsaker et al. |

OTHER PUBLICATIONS

Asynchronous Transfer Mode (ATM) Technical Overview, $2^{nd}$ Edition, Prentice Hall, Oct. 1995, Chapter 3, pp. 21-25.

Cygan, et al., "A Concatenated Two-Stage Adaptive (CTSA) Error Control Scheme for Data Transmission in Time-Varying Channels," 8089 IEEE Transactions on Communications, 1995, pp. 795-803, vol. 43.

Lee, L.H. Charles, "Convolutional Coding: Fundamentals and Applications," 1997, pp. 11-51, 1997 Artech House, Inc.

Lin et al., "Error Control Coding Fundamentals and Applications," pp. 315-349, Prentice-Hall Computer Applications in Electrical Engineering Series, Prentice-Hall, Inc. 1993.

Pursley, et al., "A Comparison of Two Methods For Erasure Generation In Frequency-Hop Communications With Partial-Band Interference And Rayleigh Fading," 1996, pp. 85-88, ieee.

Redl et al., "An Introduction to GSM", Artech House, Inc. 1995, pp. 84, 85, and 95.

Shannon, C.E., "A Mathematical Theory of Communication," The Beil System Technical Journal, vol. 27, pp. 379-423, 623-656, Jul., Oct., 1948; pp. 1-55.

Ulm et al., "Data-Over-Cable Interface Specifications, Radio Frequency Interface Speification", Hewlett Packard Interim Specification, Doc. Control No.: SP-RFII01-970321, published Mar. 21, 1997 by MCNS Holdings, L.P., Section 6, pp. 43-85.

Wolf, et al., "On the Weight Distribution of Linear Block Codes Formed From Convolutional Codes," IEEE Transactions on Communications, vol. 44, No. 9, Sep. 1996, pp. 1049-1051.

Lin et al., "Error Control Coding, Fundamentals and Applications", Prentice-Hall Computer Applications in Electrical Engineering Series, 1993, pp. 315-349.

Lee, "Convolutional Coding, Fundamentals and Applications", Artech House, Inc. pp. 11-51, 1997.

Redl et al., "An Introduction to GSM", Artech House, Inc. pp. 84, 85, and 95, 1995.

Shannon, "A Mathematical Theory of Communication", Bell System Technical Journal, pp. 379-423 (Part 1), 623-656 (Part 11), Jul. 1948.

Ulm et al., "Data-Over-Cable Interface Specifications, Radio Frequency Interface Specification", Hewlett Packard Interim Specification, Doc. Control No. SP-RFII01-970321, published Mar. 21, 1997 by MCNS Holdings, L.P., Section 6, pp. 43-85.

Wolf et al., "On the Weight Distribution of Linear Block Codes Formed From Convolutional Codes", IEEE, IEEE Transactions on Communications, vol. 44:9, Sep. 1996.

"Asynchronous Transfer Mode (ATM) Technical Overview", $2^{nd}$ Edition, Prentice Hall, Chapter 3, pp. 21-25, Oct. 1995.

* cited by examiner

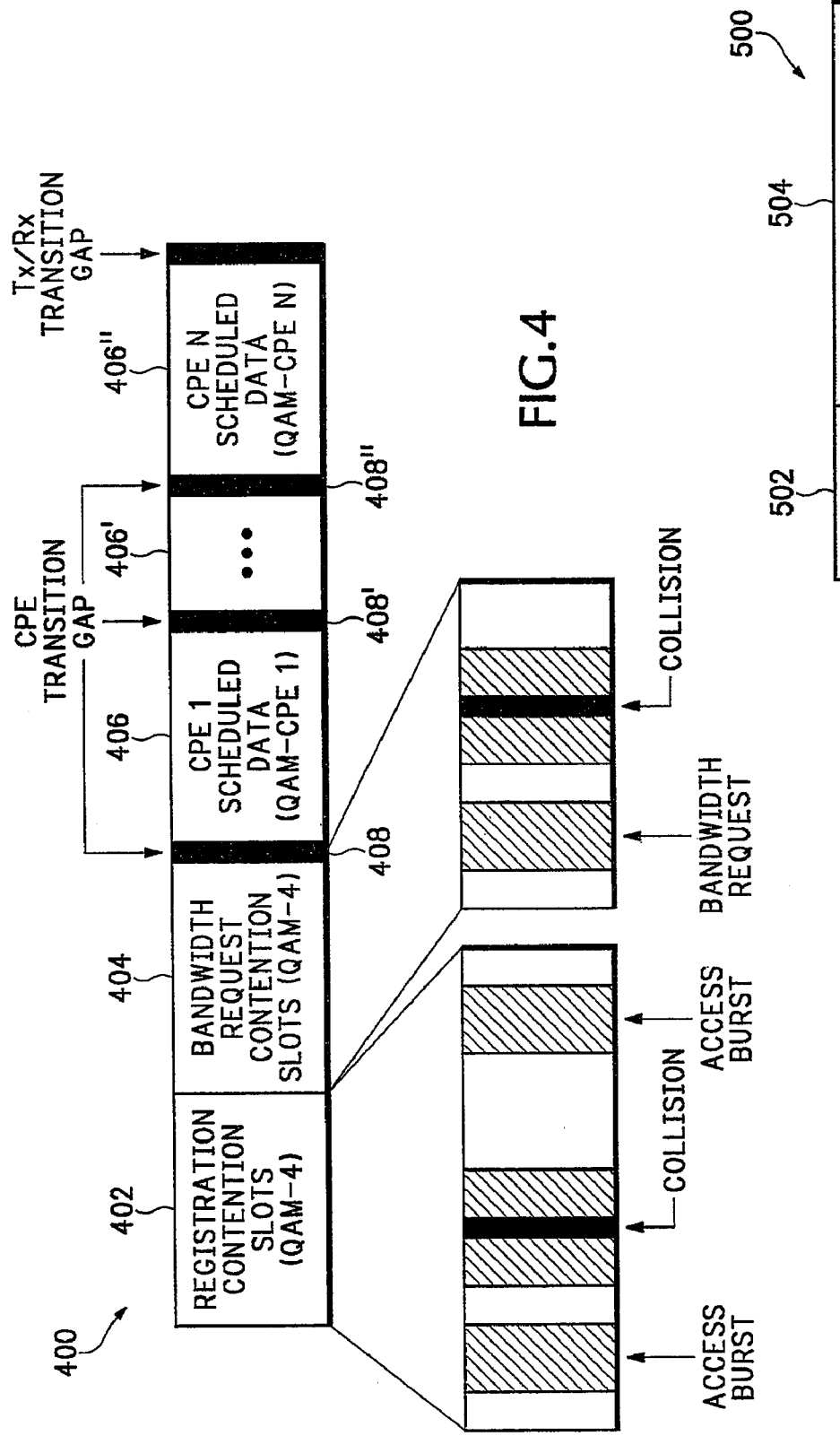

METHOD AND SYSTEM FOR PACKING MANAGEMENT MESSAGES IN A COMMUNICATION SYSTEM

This is a continuation of U.S. patent application Ser. No. 09/798,784, filed on Mar. 2, 2001.

BACKGROUND OF THE INVENTION

1. Field of the Invention

This invention relates to wireless communication systems, and more particularly to a method and apparatus for efficiently packing management messages in a broadband wireless communication system.

2. Description of Related Art

A wireless communication system facilitates two-way communication between a plurality of subscriber radio stations or subscriber units (fixed and portable) and a fixed network infrastructure. Exemplary communication systems include mobile cellular telephone systems, personal communication systems (PCS), and cordless telephones. The key objective of these wireless communication systems is to provide communication channels on demand between the plurality of subscriber units and their respective base stations in order to connect a subscriber unit user with the fixed network infrastructure (usually a wire-line system). In the wireless systems having multiple access schemes a time "frame" is used as the basic information transmission unit. Each frame is sub-divided into a plurality of time slots. Some time slots are used for control purposes and some for data transfer. Subscriber units typically communicate with the base station using a "duplexing" scheme thus allowing the exchange of information in the form of management messages and data in both directions of connection.

Transmissions from the base station to the subscriber unit are commonly referred to as "downlink" transmissions. Transmissions from the subscriber unit to the base station are commonly referred to as "uplink" transmissions. Both transmissions include, along with the data, management messages for use by the base station and subscriber to maintain the communication link. Depending upon the design criteria of a given system, the prior art wireless communication systems have typically used either time division duplexing (TDD) or frequency division duplexing (FDD) methods to facilitate the exchange of information between the base station and the subscriber units.

Recently, wideband or "broadband" wireless communications networks have been proposed for providing delivery of enhanced broadband services such as voice, data and video services. The broadband wireless communication system facilitates two-way communication between a plurality of base stations and a plurality of fixed subscriber stations or Customer Premises Equipment (CPE). One exemplary broadband wireless communication system is shown in the block diagram of FIG. 1.

As shown in FIG. 1, the exemplary broadband wireless communication system 100 includes a plurality of cells 102. Each cell 102 contains an associated cell site 104 that primarily includes a base station 106 and an active antenna array 108. Each cell 102 provides wireless connectivity between the cell's base station 106 and a plurality of customer premises equipment (CPE) 110 positioned at fixed customer sites 112 throughout the coverage area of the cell 102. Each cell may service several hundred or more residential and business CPEs 110. The users of the system 100 may include both residential and business customers. Consequently, the users of the system may have different and varying usage needs. Furthermore, these needs can be dynamic and thus require the wireless communication system 100 to continually adjust to maintain optimal system performance.

SUMMARY OF THE INVENTION

This invention relates to methods and apparatus for packing management messages in a broadband wireless communication system. The methods and apparatus can reduce the amount of bandwidth that is allocated for management messages between the stations on either side of a communication link. The method and apparatus also reduce the required CPU time of the base station and CPE in handling management messages. Without such a method, the processors in the base station and CPE can become overloaded when processing each individual management message. Management messages may be sent across a link in packets addressed to a particular connection, where the address identifies messages which may be specially treated. Such special treatment may include recognition of an overall message conveyed in such packets as containing one or more implicit messages embedded within the overall message. For example, a limited number of management message types may be defined, each associated with a message type identifier value, such that each such defined message has a predetermined number of data bytes conveying certain predetermined parameters. The message type identifier value may consist of a few bits, for example one byte.

In one aspect of the invention, different methods may be used, with the appropriate apparatus, to efficiently convey such management messages. First, each packet of information sent across the link may include the message type identifier, in which case it need not be repeated in the payload of the packet, and a number of such messages may be sent within a packet. Second, a packet of information may contain mixed management messages, in which case the byte with the message type identifier should be included with each such message. In this case, an overall message may be constructed from individual management messages simply concatenated together. Since the number of bytes in the message is defined according to the identifier, the next identifier will be found at the end of that number of bytes.

In another aspect of the invention, using either method it is preferable to pack the management messages into packets so that messages in a first packet may be parsed and acted upon without a need for any subsequent packets which may be necessary to convey an entire message. To accomplish this, any message which will not fit in a first packet may be made to be ignored, such as by being replaced with a padding pattern. In this way, any subsequent packet will have management messages which begin at the start of the effective data payload. Padding may also be added before or after an end of message or trailer information which defines the end of an overall message. Data which is not a particular fill pattern may be interpreted as a message type identifier if it is in the correct location subsequent to the previous message or at the beginning of the payload.

In a further aspect of the invention, a communication system employing such a connection management message format includes apparatus for implementing a communication link employing such management messaging.

The features, objectives, and other advantages will become more apparent from the detailed description set forth below

BRIEF DESCRIPTION OF THE DRAWINGS

FIG. 4 shows an exemplary uplink sub-frame.

FIG. 5 shows the form of an exemplary management message.

Like reference numbers and designations in the various drawings indicate like elements.

DETAILED DESCRIPTION OF THE INVENTION

Figure 1:
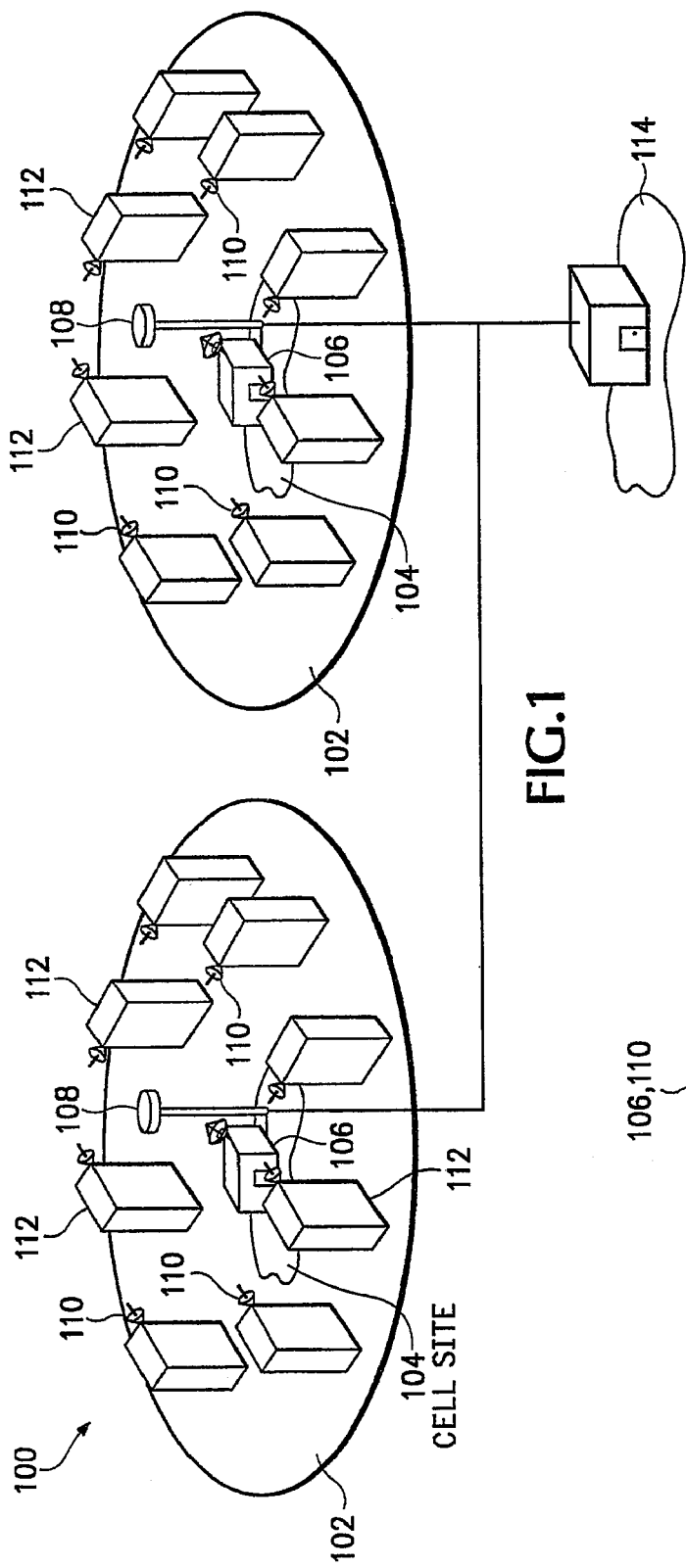
FIG. 1 shows a broadband wireless communication system.

Throughout this description, the embodiments and examples shown should be considered as exemplars, rather than as limitations on the present invention.

A method and apparatus for packing management messages in a broadband wireless communication system is described herein. One very important performance criterion of a broadband wireless communication system, and any communication system for that matter having a physical communication medium shared by a plurality of users, is how efficiently the system uses the physical medium. Because wireless communication systems are shared-medium communication networks, access and transmission by subscribers to the network must be controlled. In wireless communication systems, a Media Access Control ("MAC") protocol typically controls user accesses to the physical medium. The MAC determines when subscribers are allowed to transmit on the physical medium partially based on requests in the management messages. In addition, the MAC controls the communication link's signal characteristics, power requirements, and registration needs. For ease of description, the following text will focus on management messages used by the MAC for bandwidth allocation. However, as mentioned above, management messages are also used for, for example, the communication link's signal characteristics, power requirements, and registration needs.

Management messages, transmitted between the base station 106 and CPE 110, are used by the wireless communication system 100 to maintain its optimal performance. Management messages may contain information concerning, for example, the communication link's signal characteristics, power requirements, bandwidth needs, and registration. For example, a CPE 110 would issue a bandwidth request to the base station 106 in the form of a management message. More specifically, using management messages, the CPEs 110 request bandwidth allocations from their respective base stations 106 based upon the type and quality of services requested by the customers served by the CPEs 110. The type and quality of services available to the customers are variable and selectable. For example, these services may have different bandwidth and latency requirements. Until terminated, these services require constant, and often changing, bandwidth allocated to the service. Each one of these changes from a CPE 110 is passed to the base station 106 in the form of a management message.

Due to the wide variety of CPE 110 service requirements and the large number of CPEs 110 serviced by any one base station 106, management message requests can become burdensome and complex. Consequently, management message requests for changes to the communication link's signal characteristics, power requirements, bandwidth needs, or registration are necessarily frequent and varying. For example, due to the volatility in the uplink bandwidth requirements, the many CPEs 110 serviced by a selected base station 106 will frequently initiate bandwidth allocation management message requests. In a wireless communication system 100 that uses a fixed size packet protocol for transmitting information between CPEs 110 and base stations 106, transmission bandwidth is wasted unless the length of the management message is exactly the same as the fixed size packets. If left unchecked, the bandwidth required to accommodate CPE 110 management message requests would become disproportionately high in comparison with the bandwidth allocated for the transmission of substantive traffic data. Furthermore, since the base station 106 and CPE 110 handle each management message request individually, their processors can become overloaded due to the high traffic of management messages. Thus, the communication system's bandwidth and CPU time that are available to provide broadband services will be disadvantageously reduced.

Therefore, a need exists for a method and apparatus that can dynamically and efficiently accommodate management messages in a broadband wireless communication system. The method and apparatus should be efficient in terms of the amount of system bandwidth consumed by the actual management message requests. That is, the plurality of management messages generated by the CPEs 110 should consume a minimum percentage of available uplink bandwidth. Further, the method and apparatus should be capable of processing an arbitrarily large number of management messages from a relatively large number of CPEs 110. For example, in the system shown in FIG. 1, as many as one hundred CPEs 110 may be allowed to be simultaneously active, coordinating their transmissions on the uplink. Furthermore, the system can accommodate approximately one thousand CPEs 110 on the physical channel. Therefore, the need exists for a method and apparatus that can process and respond to the management messages generated by a large number of CPEs 110. Such a method and apparatus is described herein.

Figure 1A:
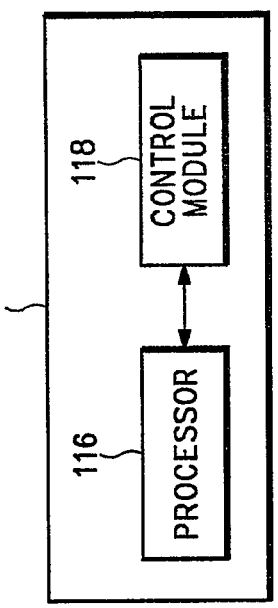
FIG. 1A is a block diagram illustrating one embodiment of a base station and a CPE.

In the system shown in FIG. 1, the MAC is executed by hardware under software or firmware control present in the base stations 106 (in some embodiments, the software may execute on processors both in the base stations and the CPE), and controls the transmission time for all of the CPEs 110. Embodiments of the base station 106 and CPE 110 are shown in FIG. 1A to each include a processor 116 and a control module 118 for running the MAC.

The base stations 106 receive requests for transmission rights in the form of MAC management messages and grant these requests within the time available, taking into account the priorities, service types, quality of service and other factors such as recent usage level which are associated with the CPEs 110. The base station MAC maps and allocates bandwidth for both the uplink and downlink communication links. These maps are developed and maintained by the base station 106 and are referred to as the Uplink Sub-frame Maps and Downlink Sub-frame Maps. The MAC allocates sufficient bandwidth to accommodate the bandwidth requirements imposed by high priority constant bit rate services such as T1, E1 and similar constant bit rate services. In addition, the MAC allocates the remaining system bandwidth across the lower priority services such as Internet Protocol data services.

The downlink of the communication system shown in FIG. 1 operates on a point-to-multi-point basis (i.e., from the base station 106 to the plurality of CPEs 110). The central base station 106 includes a sectored active antenna array 108 which is capable of simultaneously transmitting to several sectors. In one embodiment of the system 100, the active antenna array 108 transmits to six independent sectors simultaneously. Within a given frequency channel and antenna sector, all stations receive the same transmission. The base station 106 is the only transmitter operating in the downlink direction, hence it transmits without having to coordinate with other base stations 106, except for the overall time-division duplexing that divides time into upstream (uplink) and downstream (downlink) transmission periods. The base station 106 broadcasts to all of the CPEs 110 in a sector (and frequency). The CPEs 110 monitor the addresses in the received messages and retain only those addressed to them.

Both the CPEs 110 and the base stations 106 may perform the tasks ascribed to them using a combination of hardware, firmware and software control. Engineering considerations drive the allocation of functions to software, firmware and/or hardware. In particular, both the CPEs 110 and the base stations 106 will generally employ a computer running a software program which perform the ascribed functions, or directs hardware to performs the ascribed tasks in functional modules prepared for such tasks. At least some of the physical communication is performed in hardware, but data manipulations may be performed, for example, by a computer operating under software control, or by microprocessors operating under firmware control, or by application specific integrated circuits (ASICs) or field programmable gate array, a portion of which is used for the specific manipulations.

The CPEs 110 share the uplink on a demand basis that is controlled by the base station MAC. Depending upon the class of service utilized by a CPE 110, the base station 106 may issue a selected CPE 110 continuing rights to transmit on the uplink, or the right to transmit may be granted by a base station 106 on a "polling" basis, or after receipt of a request from the CPE 110. In addition to individually addressed messages, messages may also be sent by the base station 106 to multicast groups (management messages and video distribution are examples of multicast applications) as well as broadcast to all CPEs 110.

Within each sector CPEs 110 adhere to a transmission protocol that minimizes contention between CPEs 110 and enables the service to be tailored to the delay and bandwidth requirements of each user application. As described below in more detail, this transmission protocol is accomplished through the use of a polling mechanism, with contention procedures used as a backup mechanism should unusual conditions render the polling of all CPEs 110 unfeasible in light of given delay and response-time constraints. Real-time service applications such as voice and video services require that bandwidth allocations be made in a timely manner and in adherence to very tightly-controlled schedules.

Frame Maps—Uplink and Downlink Sub-frame Mappings

The base stations 106 may maintain sub-frame maps of the bandwidth allocated to the uplink and downlink communication links. The uplink and downlink can be multiplexed in a time-division duplex (TDD) manner. In one embodiment, a frame is defined as comprising N consecutive time periods or time slots (where N remains constant). In accordance with this "frame-based" approach, the communication system dynamically configures the first $N_1$ time slots (where N is greater than or equal to $N_1$) for downlink transmissions only. The remaining $N_2$ time slots are dynamically configured for uplink transmissions only (where $N_2$ equals $N - N_1$). Under this TDD frame-based scheme, the downlink sub-frame is generally transmitted first and is prefixed with information that is necessary for frame synchronization.

Figure 2:
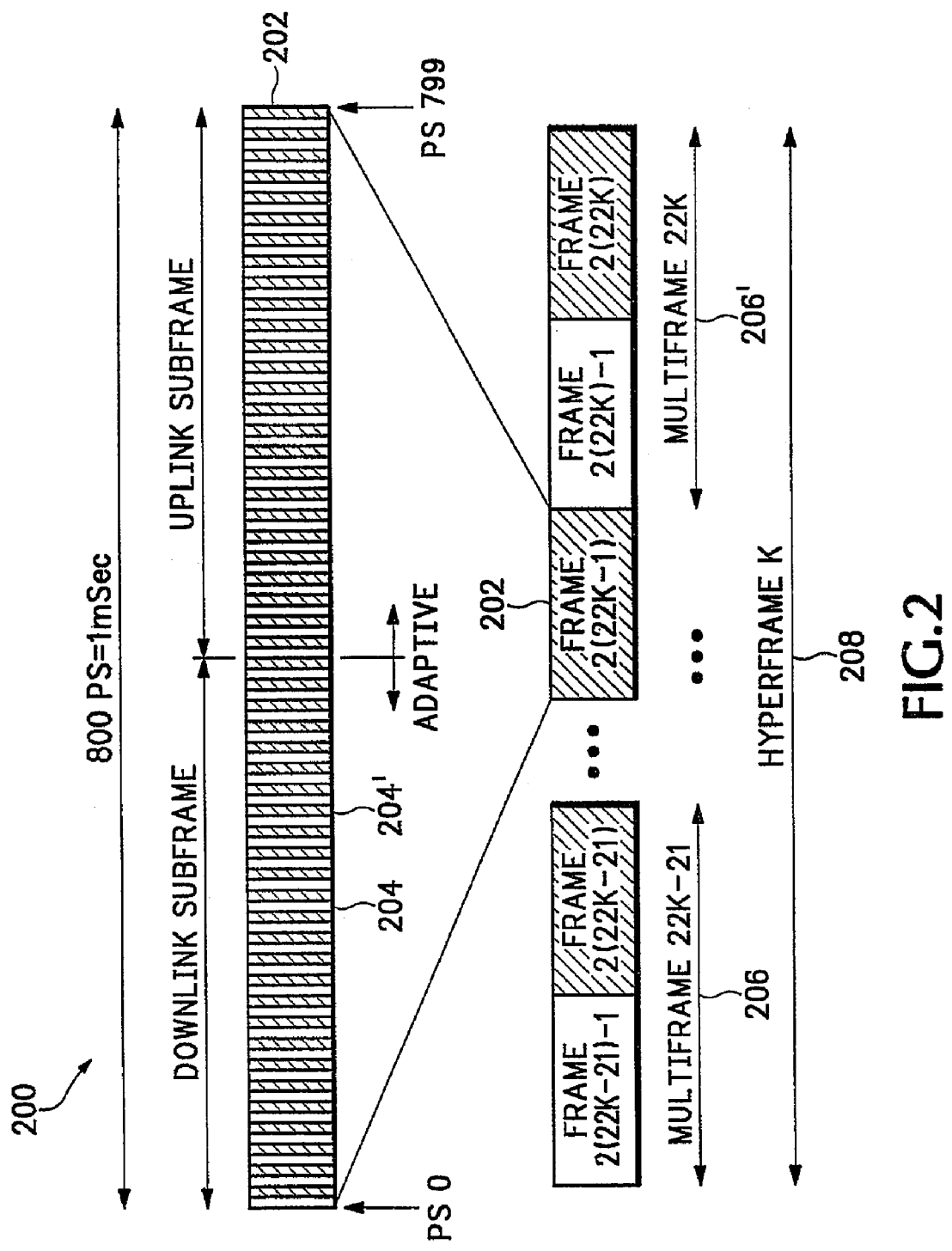
FIG. 2 shows a TDD frame and multi-frame structure that can be used by the communication system of FIG. 1.

FIG. 2 shows a TDD frame and multi-frame structure 200 that can be used by a communication system (such as that shown in FIG. 1). As shown in FIG. 2, the TDD frame is subdivided into a plurality of physical layer slots (PS) 204. In the embodiment shown in FIG. 2, the frame is one millisecond in duration and includes 800 physical slots. Alternatively, frames having longer or shorter duration and with more or fewer PSs can be used. The available bandwidth is allocated by a base station 106 in units of PSs. Some form of digital encoding, such as the well-known Reed-Solomon encoding method, is performed on the digital information over a predefined number of bit units referred to as physical layer information elements (PI). The modulation may vary within the frame and determines the number of PS (and therefore the amount of time) required to transmit a selected PI.

In the broadband wireless communication system shown in FIG. 1, the TDD framing may be adaptive. That is, the number of PSs allocated to the downlink versus the uplink varies over time. The packing technique of management messages can be used in both adaptive and fixed TDD systems using a frame and multi-frame structure similar to that shown in FIG. 2 as well as in framed FDD systems. As shown in FIG. 2, to aid periodic functions, multiple frames 202 are grouped into multi-frames 206, and multiple multi-frames 206 are grouped into hyper-frames 208. In one embodiment, each multi-frame 206 comprises two frames 202, and each hyper-frame comprises twenty-two multi-frames 206. Other frame, multi-frame and hyper-frame structures can be used. For example, in another embodiment each multi-frame 206 comprises sixteen frames 202, and each hyper-frame comprises thirty-two multi-frames 206. Exemplary downlink and uplink sub-frames are shown respectively in FIGS. 3 and 4.

Downlink Sub-frame Map

Figure 3:
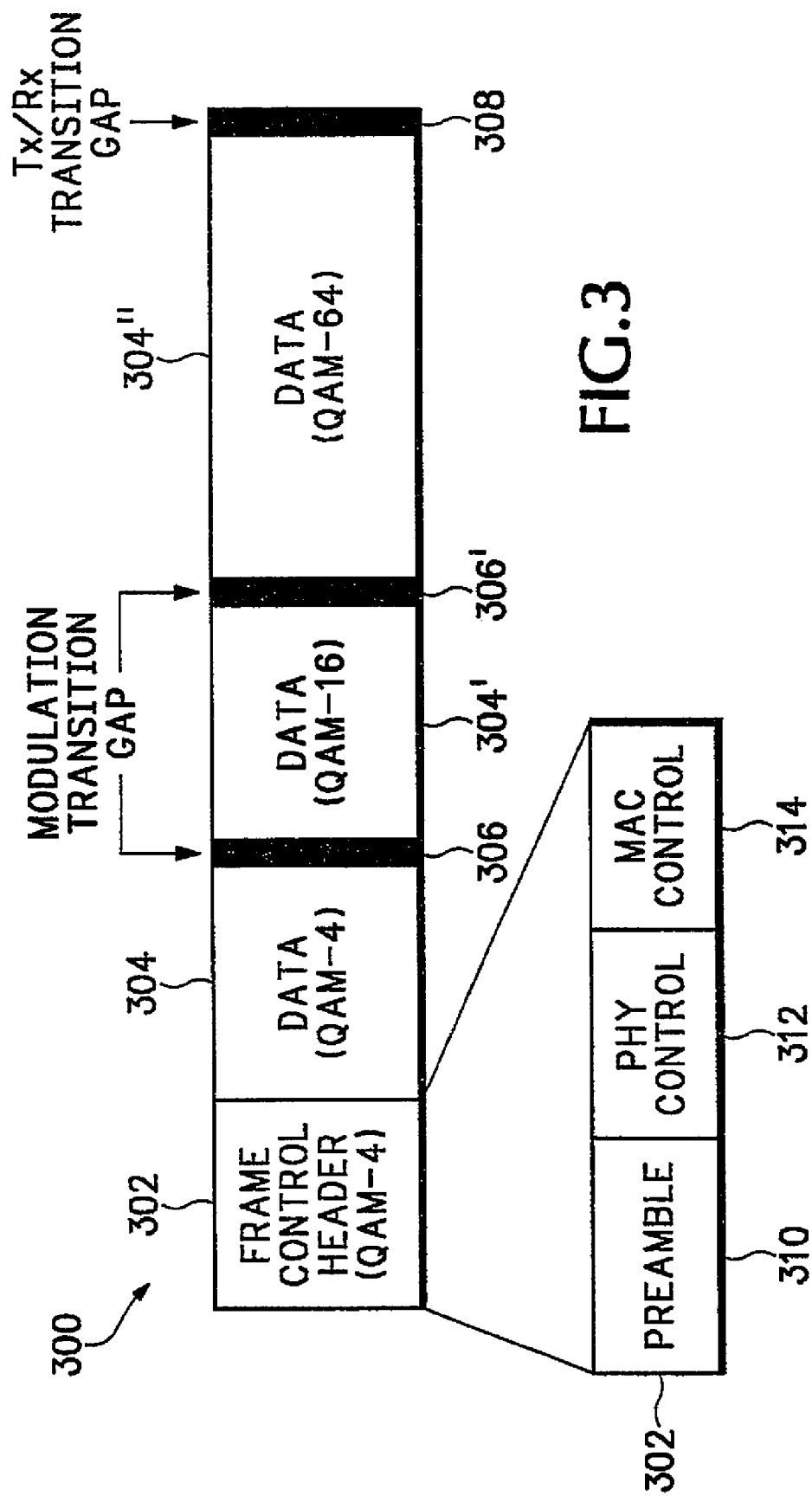
FIG. 3 shows an example of a downlink sub-frame that can be used by the base stations to transmit information to the plurality of CPEs in the wireless communication of FIG. 1.

FIG. 3 shows one example of a downlink sub-frame 300 that can be used by the base stations 106 to transmit information to the plurality of CPEs 110. As described in more detail in that application, such a system includes a modem and a control module which cooperate to create and transmit the downlink sub-frame 300. The base station 106 may maintain a downlink sub-frame map that reflects the downlink bandwidth allocation. The downlink sub-frame 300 may comprise a frame control header 302, a plurality of downlink data PSs 304 grouped by modulation type (e.g., PS 304 data modulated using a QAM-4 modulation scheme, PS 304' data modulated using QAM-16, etc.) and possibly separated by associated modulation transition gaps (MTGs) 306 used to separate differently modulated data, and a transmit/receive transition gap 308. In any selected downlink sub-frame, any one or more of the differently modulated data blocks may be absent. Modulation transition gaps (MTGs) 306 may be 0 PS in duration. As shown in FIG. 3, the frame control header 302 contains a preamble 310 used by the physical protocol layer (PHY) for synchronization and equalization purposes. The frame control header 302 also includes control sections for both PHY control messages 312 and MAC control messages 314 for transmission of management messages to the CPE 110.

The downlink data PSs are used for transmitting data and management messages to the CPEs 110. This data may be encoded (using a Reed-Solomon encoding scheme, for example) and transmitted at the current operating modulation used by the selected CPE 110. Data may be transmitted in a pre-defined modulation sequence, such as: QAM-4, followed by QAM-16, followed by QAM-64. The modulation transition gaps 306 are used to separate the modulations and may be 0 PS in duration. The PHY Control portion 312 of the frame control header 302 may contain a broadcast message indicating the identity of the PS 304 at which the modulation scheme changes. Finally, as shown in FIG. 3, the Tx/Rx transition gap 308 separates the downlink sub-frame from the uplink sub-frame which is described in more detail below.

Uplink Sub-Frame Map

FIG. 4 shows one example of an uplink sub-frame 400 that is adapted for use with a bandwidth allocation scheme such as is described in U.S. patent application 60/257,525, filed Dec. 22, 2000 and entitled "Method and System for Adaptively Allocating Bandwidth in a Communication System" which is hereby incorporated by reference. Here, the CPEs 110 (FIG. 1) use the uplink sub-frame 400 to transmit information (including management messages for bandwidth requests) to their associated base stations 106. As shown in FIG. 4, there are three main classes of MAC management messages that are transmitted by the CPEs 110 during the uplink frame: (1) messages transmitted in contention slots reserved for CPE registration (Registration Contention Slots 402); (2) messages transmitted in contention slots reserved for responses to multicast and broadcast polls for bandwidth allocation (Bandwidth Request Contention Slots 404); and (3) messages transmitted in bandwidth specifically allocated to individual CPEs 110 (CPE Scheduled Data Slots 406).

The bandwidth allocated for contention slots (i.e., the contention slots 402 and 404) may be grouped together and is transmitted using a pre-determined modulation scheme. For example, in the embodiment shown in FIG. 4 the contention slots 402 and 404 are transmitted using a QAM-4 modulation. The remaining bandwidth is grouped by CPE 110. During its scheduled bandwidth, a CPE 110 transmits with a fixed modulation that can be determined by the effects of environmental factors on the transmission between that CPE 110 and its associated base station 106 (see FIG. 1). The downlink sub-frame 400 includes a plurality of CPE 110 transition gaps (CTGs) 408 that serve a similar function to the modulation transition gaps (MTGs) 306 described above with reference to FIG. 3. That is, the CTGs 408 separate the transmissions from the various CPEs 110 during the uplink sub-frame. In one embodiment, the CTGs 408 are 2 physical slots in duration. A transmitting CPE 110 may transmit a 1 PS preamble during the second PS of the CTG 408, thereby allowing the base station 106 to synchronize to the newly transmitted CPE 110. Multiple CPEs 110 may transmit in the registration contention period simultaneously.

Scheduled uplink traffic data is bandwidth allocated to specific CPEs for the transmission of management messages and services data. The CPE scheduled data is ordered within the uplink sub-frame 400 based upon the modulation scheme used by the CPEs. Bandwidth is requested by a CPE and is subsequently granted by an associated base station. All of the bandwidth allocated to a selected CPE within a given TDD frame (or alternatively an adaptive TDD frame, as the case may be) is grouped into a contiguous CPE scheduled data block 406. The physical slots allocated for the CTGs 408 are included in the bandwidth allocation to a selected CPE in the base station uplink sub-frame map.

In addition to the bandwidth that is allocated for the transmission of the various types of broadband services (i.e., the bandwidth allocated for the CPE scheduled data slots 406), and the bandwidth allocated for CPE registration contention slots, bandwidth is also allocated by the base station MAC for management messages such as requests for additional bandwidth allocations. As described in more detail below, CPEs request changes to their bandwidth allocations by making bandwidth requests of their associated base stations using management messages. The present method and apparatus can reduce the amount of bandwidth that is set aside for these bandwidth allocation requests.

Addressing CPEs

CPE equipment is generally assigned a hardware address when it is manufactured; such address may be, for example, 48 bits long or 64 bits long. The base station ("BS") will examine that address when the CPE is registering, and if the number is approved then the BS will accept the CPE for communication. Since 48 bits is more than is needed in most circumstances, the addresses of typical packets used in the exemplary system are limited to 16 bits (more or less bits could of course be chosen). Thus, each service or connection which the CPE handles will be assigned a service connection ID of (e.g.) 16 bits. Moreover, during the registration, the BS will also assign to the CPE two different 16-bit addresses, a basic connection ID and a control connection ID. Once the 16-bit connection IDs have been established, they are used by both the BS for transmissions to the CPE and by the CPE for transmissions to the BS.

It is not necessary for the CPE to have two addresses for communications with the BS, but doing so permits partitioning of the types of messages sent using each. Thus, the two different CPE addresses, basic and control, are handled differently both in destination of the messages and quality of service (QoS) assigned to the connection. The basic connection ID is used by the base station MAC and the CPE MAC to exchange MAC management messages between the CPE and the base station. The control connection ID (also assigned during registration) is used by the base station and the CPE to exchange control and configuration information between the base station and the CPE at higher levels of control.

Management Messages

One embodiment of a management message 500 is shown in FIG. 5. The management message includes the message type ID 502, for example, bandwidth or registration request, and the message body 504. The message type ID 502 need only have enough bits to distinguish all actually used types of control messages; it is typically just one byte. Examples of such message types include: bandwidth requests, modulation change requests, power level change requests, and channel assignment change requests, to name just a few. The message body 504 is of a length and meaning which is specific to the message type identified in the (e.g. one-byte) message type ID 502. The different types of messages require different numbers of bytes to convey the relevant information, so a typical message, including the message type byte, may be for example 4 to 10 bytes long. In one embodiment, each management message 500 may be inserted into a MAC packet having a MAC basic connection ID. Since the MAC packet header is 4 to 6 bytes, the total length of such a management message, packaged for transmission between the BS and the CPE, is about 8 to 16 bytes.

The CPE's MAC layer may recognize a need to transmit information to the BS for one or more connections. In an exemplary embodiment, separate bandwidth requests will be made for each individual connection which a CPE is servicing. Upon recognizing a need for bandwidth for a particular connection which the CPE is servicing, the CPE may prepare a bandwidth request message for transmission to the BS; such a management message will be addressed with the CPE's basic connection ID. The connection ID will tell the BS that the message is a management message, while the first byte of the message, as explained, will tell the BS that it is a bandwidth request message.

Figure 6:
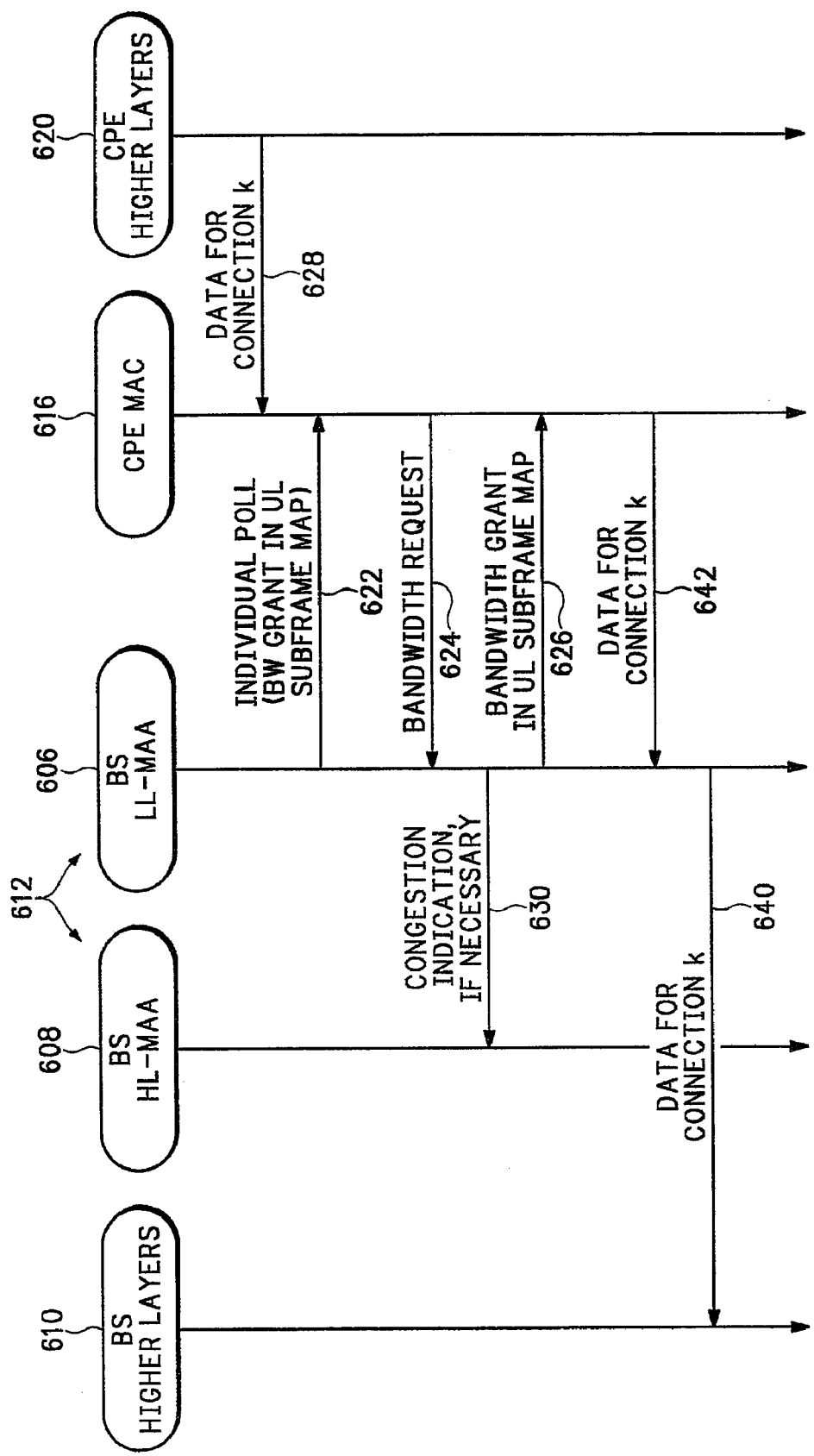
FIG. 6 is a diagram of information flow for management messages.

The information exchange sequence for typical management messages, in this case bandwidth requests, is shown in the flow diagram of FIG. 6. As shown in FIG. 6, the base station may have several layers of control mechanisms or domains 606, 608 and 610. For example such a system is described in U.S. patent application Ser. No. 09/430,379 filed Oct. 29, 1999, entitled "Method and Apparatus for Data Transportation and Synchronization between MAC and Physical Layers in a Wireless Communication System," and hereby incorporated by reference.

As shown in FIG. 1A, these control mechanisms may be implemented as control modules 118. The control module 118 may advantageously contain program logic, or other substrate configuration representing data and instructions, which cause the control module 118 to operate in a specific and predefined manner as described herein. In one embodiment, the program logic may advantageously be implemented as one or more modules. The modules may advantageously be configured to reside on the addressable storage medium and configured to execute on one or more processors. The modules include, but are not limited to, software or hardware components, which perform certain tasks. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. A program for use with the control module 118 may be written in any programming language such as C, C++, BASIC, Pascal, Java, and FORTRAN and run under the well-known operating system. C, C++, BASIC, Pascal, Java, and FORTRAN are industry standard programming languages for which many commercial compilers may be used to create executable code.

In one embodiment, the control module 118 comprises a processor 116. The processor may be a uni-processor or multi-processor machine, such as a Pentium™ processor, a Pentium™ II processor, a Pentium™ III processor, a Pentium™ Pro processor, an xx86 processor, an 8051 processor, a MIPS™ processor, a Power PC™ processor, an AMD Athlon™ processor, an AMD Duron™ processor, or an ALPHA™ processor. In addition, the processor may be any conventional special purpose microprocessor such as a digital signal processor or a graphics processor.

The Low Level Media Access Arbitration ("LL-MAA") domain 606 and the Low Level Media Access Arbitration ("HL-MAA") domain 608 are sub-domains of the overall BS media access control (MAC) layer 612. The LL-MAA MAC domain 606 may span a physical channel, and each physical channel may be managed by an instance of the LL-MAA MAC domain 606. The HL-MAA MAC domain 608 spans multiple physical channels, typically all of the physical channels in the same sector. Each of these layers thus has particular functions. These functions may be performed by particular hardware, such as parts of ASICs, under the control of particular programs. The blocks are defined functionally, and those skilled in the art will understand that the functions of a plurality of functional blocks such as listed above may in general be performed by the same or different hardware, under control of the same or different software. The overall MAC 612, which includes the LL-MAA MAC domain 606 and the HL-MAA MAC domains 608, interacts with higher layers 610 of the BS.

On the CPE side, there is generally no need for the functions of a HL-MAA domain such as 608, because in the exemplary embodiment each CPE communicates with only the BS. However, each CPE may have several channels of connection to the BS available to it, and some of the functionality of the HL-MAA may be required. Because of this limited need for intermediate level control, the CPE has only an overall MAC 616 identified. As in the BS, the MAC 616 interacts with the CPE higher layers 620 and can also be implemented as control modules 118.

Many of the management messages between the BS and the CPE are generated at the BS LL-MAA domain 606 or the CPE MAC domain 616. For example, the CPE MAC domain 616 will recognize a need for bandwidth from a particular connection which sends data to it for transmission to the BS, and will generate a bandwidth request 624. Other management messages from the lower levels of the MAC may include requests processed by the LL-MAA layer in response to physical layer (not shown) issues, such as clock timing information, modulation change information, or power change requests. In the exemplary embodiment, the LL-MAA performs the actual structuring of messages actually transmitted over the air, and also includes the intelligence needed to format the various requests into management messages. Of course, this functionality may be moved to different layers. In the exemplary embodiment, some management messages are produced by the HL-MAA 608. For example, the HL-MAA 608 may observe, from the congestion indication 630 from various LL-MAA domains, that some channels within its sector are not fully utilized, while other channels have bandwidth requests which exceed the channel capacity. It may therefore want a particular CPE to move from a congested channel to a less crowded channel, and may prepare and return a channel change request to the LL-MAA for directing a particular CPE to change to a different channel. Thus, management messages may come from a variety of sources, and in principle could even originate at the higher layers of either the BS or the CPE.

Also shown in FIG. 6 is the transmission path for basic service connection data 642 from the CPE to the BS, which is done with respect to connection "k" (identified by a service connection ID of e.g. 16 bits), and the same data for connection "k" conveyed within the BS from LL-MAA 606 to the higher layers 610 of the BS. This is essentially the same data path which is used for the "control connection" of the CPE.

Since it is sent on a different connection ID, control connection information may be sent between the CPE and the BS without the constraints which are placed upon management messages. Such control connection information, therefore, is more flexible. Connection provisioning information, as an example, may be sent via the control connection.

Also as shown in FIG. 6, the base station may individually poll (as indicated by control arrow 622) a CPE by allocating bandwidth sufficient for the CPE to respond with a bandwidth request message. This bandwidth is allocated in the uplink sub-frame 400. If the CPE MAC 616 determines that there is data to be sent for a selected connection "k" (typically determined by being instructed by a higher CPE control layer 612 via a control path 628), then the CPE MAC control mechanism issues a bandwidth request 624 to the base station LL-MAA 606. If there is insufficient bandwidth available to the CPE as determined by the base station's LL-MAA 606, the bandwidth request will not be granted. Otherwise, the bandwidth request will be granted and this will be implicitly communicated to the CPE MAC 616 by the base station allocating additional bandwidth to the CPE in the uplink sub-frame 400. This is shown in FIG. 6 via the control path 622. The CPE will then begin transmitting data to the base station over the uplink using the bandwidth that has been allocated to it.

MAC Header Format

In one embodiment, data is sent in packets prefaced with a header containing the connection ID and a variety of status bits and other fields. The connection ID is recognized by the users and indicates data is being sent to them by the base station. The users then process the packets appropriately based on information referenced by the connection ID.

Figure 7:
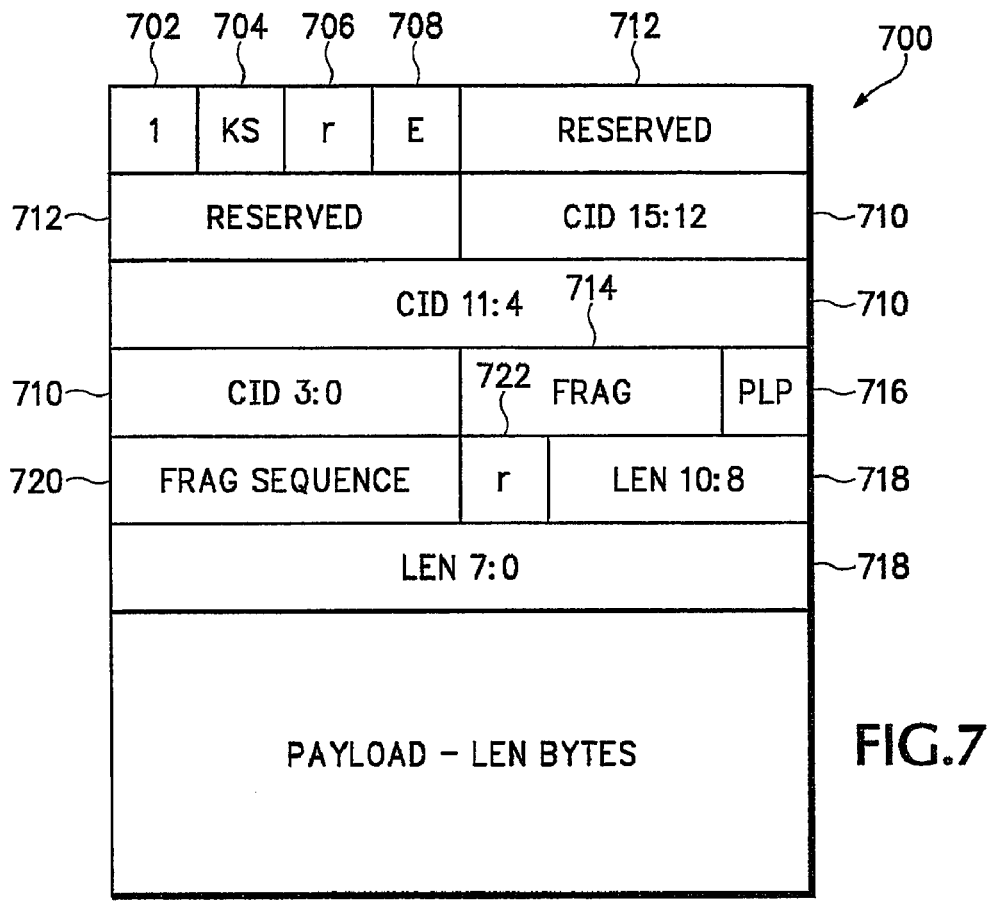
FIG. 7 is a diagram of an exemplary format for a MAC header used with variable length packets.
Figure 8:
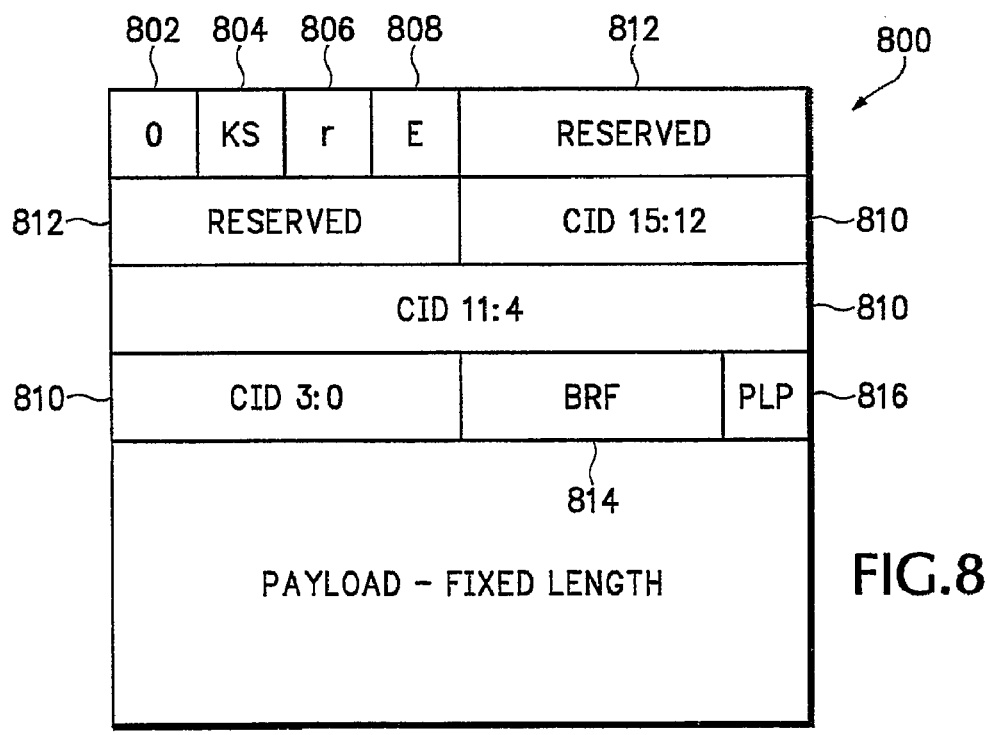
FIG. 8 is a diagram of an exemplary format for a MAC header used with fixed size packets.

FIGS. 7 and 8 are examples of formats for a MAC header. The header shown in FIG. 7 supports variable length packets. While the header of FIG. 8 is for use with communication systems where the backhaul to the base station uses fixed size packets, for example ATM. In one embodiment, a fixed packet size backhaul uses a variable size MAC packet. This embodiment would employ a convergence sub-layer to assemble variable length packets into fixed length ones.

For ease of description, the following describes one format of a MAC header. However, multiple embodiments of the elements of the described header are within the scope of the invention. The MAC headers 700, 800 start with a standard header flag 702, 802 which is used to differentiate between variable length and fixed length systems. The next element is a key sequence bit 704, 804 which is used to change between a plurality of keys. The keys are for over-the-air encryption to support privacy. The key bits indicate which key to use to encrypt/decrypt the packet. A reserved bit 706, 806 is provided to separate the key sequence bit from an encryption bit 708, 808. The encryption bit 708, 808 is used to identify whether the payload is encrypted. The connection ID 710, 810, as discussed above, is a 16-bit destination identifier set up between the BS and CPE at the time of connection establishment. The connection ID 710, 810 is preceded by 8 bits reserved 712, 812 for future expansion of the connection ID field.

The MAC header 700 further includes a 3-bit fragmentation control field 714. The fragmentation control field 714 is used to perform fragmentation of the variable size packets. For MAC header 800, which does not fragment packets, the three bits are defined as reserved for backhaul fragmentation 814. These bits 814 pass through backhaul specific fragmentation information. The next element is the packet loss priority (PLP) bit 716, 816. The PLP 716, 816 is used to discard low priority packets when congestion occurs over the air. For the MAC header 700, an 11-bit length field 718 indicates the number of bytes in the MAC packet payload. The embodiment of MAC header 700 further includes a 4-bit fragmentation sequence 720 and one reserved bit 722.

For MAC headers used in the uplink, the reserved bit 706, 806 is replaced by a 1-bit Poll Me field (not shown). The Poll Me bit is used to indicate that the CPE requests to be polled for bandwidth or connection requests.

ATM Protocol

Figure 9:
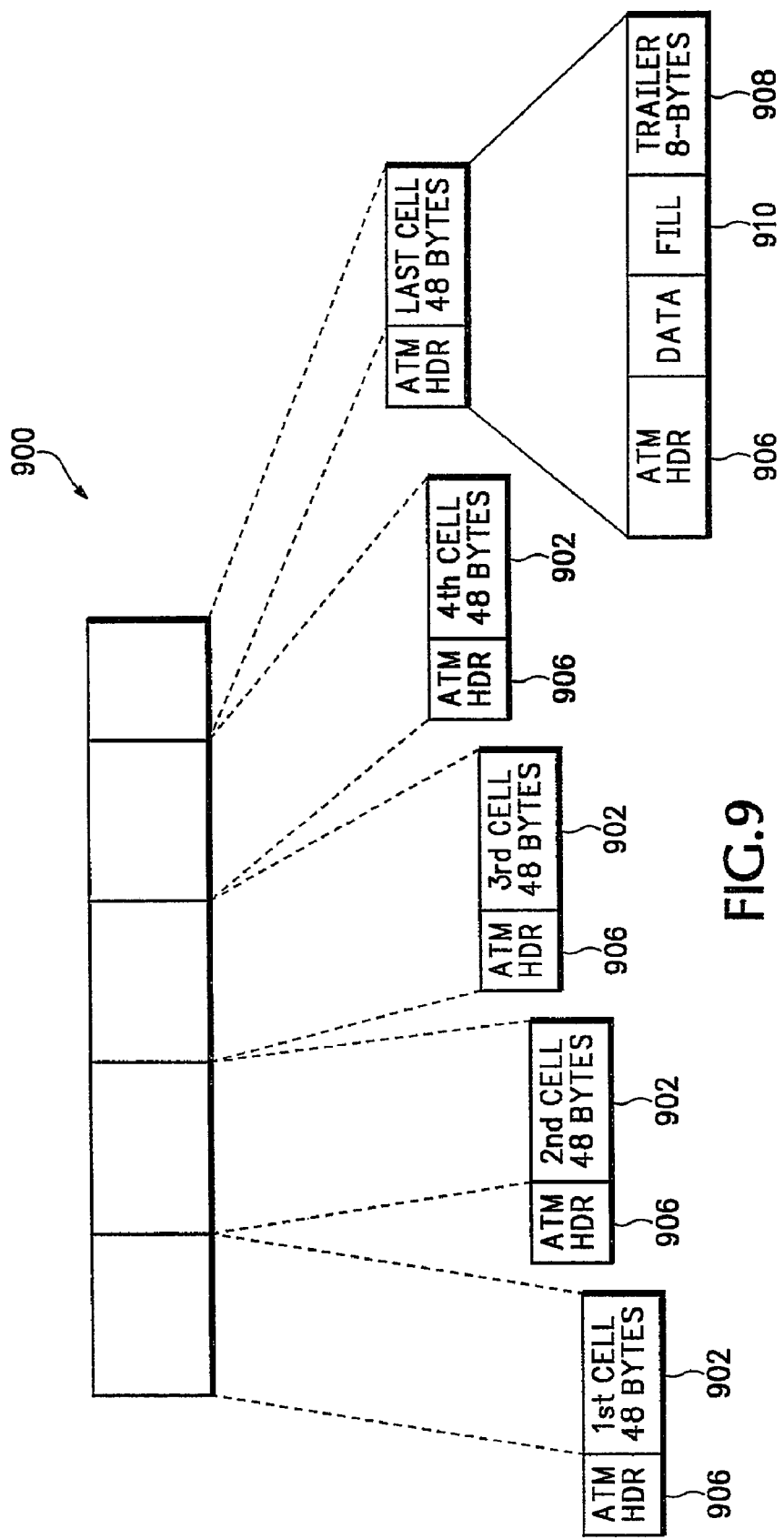
FIG. 9 shows the form of a fixed size packet protocol called asynchronous transfer mode (ATM) using an ATM Adaptation Layer (AAL-5).

FIG. 9 is an example of a fixed size packet protocol in a wireless communication system 100 called asynchronous transfer mode (ATM) using ATM Adaptation Layer 5 (AAL-5). ATM is an international standard of switching and multiplexing for high-speed broadband digital transmission where data bytes are organized into cells with a fixed length. ATM allows the use of multiple data streams to flexibly share the available bandwidth while providing a predetermined quality of service to each CPE.

As illustrated by the first, second, third, and fourth cells, basic ATM segments data into 48-byte chunks 902 which have a 5 byte header 906 pre-pended giving a total of 53-bytes. The header 906 consists of information fields allocated to services on demand. There are several adaptation layers that are available to convert a packet data unit (PDU) 900 to this form. For example, AAL-1, AAL-2, AAL-3/4, and AAL-5 are types of adaptation layers well known in the art. Depending upon the selected AAL, additional segmentation of the ATM cells may be performed. For example, AAL-5 adds an 8-byte trailer 908 and fill data 910 to the PDU 900 unlike AAL-1. As the higher level PDUs may be of an arbitrary size, the selected AAL includes two sublayers to perform this conversion. The first sublayer performs the segmentation and reassembly (SAR) of the higher layer PDUs. The second sublayer, called the convergence sublayer (CS), packages the higher layer PDU with any additional information required for the adaptation.

Still referring to FIG. 9, one embodiment of the wireless communication system 100 using AAL-5 is disclosed. As mentioned above, AAL-5 takes the original PDU 900 and adds the 8-byte trailer 908. Fill data or padding 910 is then added to the original PDU 900 such that the PDU 900 forms a multiple of 48-bytes. Once this occurs, the PDU 900 is segmented into 48-byte chunks 902, each with its own ATM header 906. Thus, only the last or final cell formed from the PDU 900 will include a trailer 908 and fill 910.

Since most MAC management messages exchanged between the CPEs and base station have a total length of less than 16 bytes, a large percentage of the bandwidth used to send such messages is wasted in wireless communication systems 100 that use a fixed size or a variable length protocol that uses cells or blocks that are larger than 16 bytes.

Single and Multiple Management Messages Packed in a Cell

Multiple management messages to or from the same CPE may be packed into a single MAC packet, for example, ATM. In systems with variable length packet data units (PDU), MAC management messages are simply packed one after the other. The entire PDU is transmitted in one frame and thus no fragmentation occurs. Since the header of each packet contains the basic connection ID for the CPE, the message may be interpreted as containing only management messages. For each such message, the first byte (or other message type ID 502) may identify the type of message; and from this type, the receiving station knows how many more bytes of data are contained within that particular message. Thus, many such messages may be extracted with no more separation being required than the typical one-byte message-type identification 502.

In embodiments of the wireless communication system 100 that use a fixed length PDU, for example using ATM, the issue is slightly more complex. For the fixed length PDU case, the segmentation and reassembly (SAR) function native to the fixed length PDU scheme being transported is used. For example, in one embodiment where the fixed length scheme is ATM, the packed MAC management messages use the SAR functionality of ATM Adaptation Layer 5 (AAL-5). The MAC message header, which is for example 4 or 6 bytes, replaces the ATM header in the ATM packet. The header of the packet in which a management message is transported includes CPE related information, including the basic connection ID, rather than information that is specific to the management message. For this connection ID the receiving station can identify sub-messages, including their beginning and ending locations, from the message-type ID 502, so again it should be possible to include a plurality of management messages within the payload 902 of single packets 900. An overall message may be formed which includes several management messages concatenated together.

A problem arises, however, due to two factors. First, each such overall message, in many protocols such as ATM AAL-5, a variable-length message is not considered completed until trailer information 904 is received, and a receiving station may be unable to process a partial "overall message" which does not have the trailer 904 packet of information. Second, most management message groups will not require more than one ATM or other fixed-length cell; as such, it would be wasteful of bandwidth to perform a poll by providing more than one ATM cell slot of uplink bandwidth for the CPE, and hence only one ATM cell bandwidth will typically be provided. If there is only a single bandwidth request in the cell, this will not create problems, nor will there be a problem if there are several management messages which all fit in the cell with room for the "end of message" trailer 904. However, if enough management messages are combined to overrun a single ATM cell, then the bandwidth request included may not be able to be processed. The BS will therefore not allocate further uplink bandwidth in accordance with the BW request, and the CPE may be unable to complete the message until the BS happens to poll the CPE again. By the time such a further poll occurs, more management messages may have accumulated, and lockup may proceed indefinitely.

Figure 10:
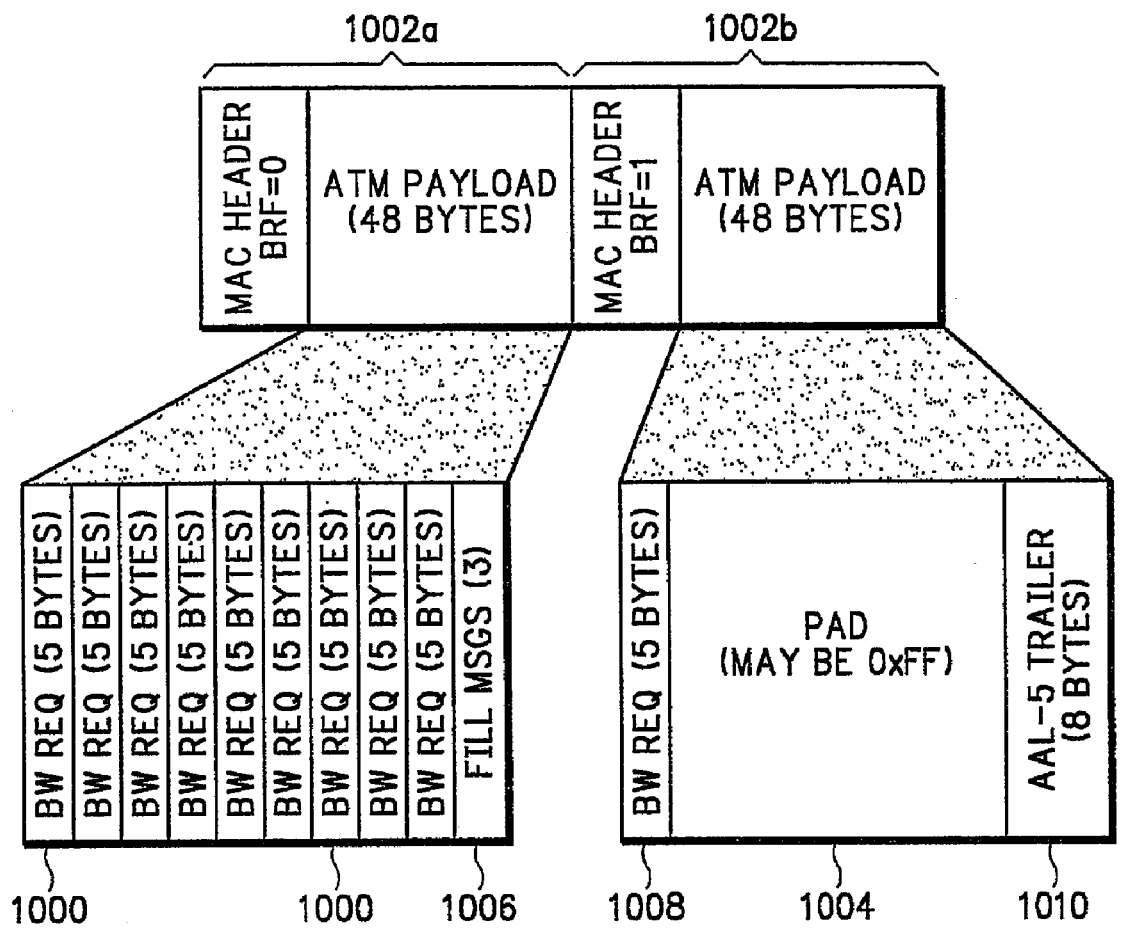
FIG. 10 illustrates the packing of 10 bandwidth request messages into two ATM cells in the ATM Adaptation Layer (AAL-5) of a user frame.

One may solve the problem presented by this packing approach by strictly limiting the number of management messages transported as shown in FIG. 10. For example, since a bandwidth request 1000 requires (e.g.) 5 bytes, and a typical MAC packet payload is 48 bytes (as with ATM cells), up to 8 bandwidth requests may be packed into a single MAC packet 1002a and still leave room for an 8-byte AAL-5 trailer. If further BW requests are needed, then a further uplink slot will be awaited, and the BW request conveyed at that time. The first MAC packet may arrive at the BS and be processed, so the BS will allocate BW if it is available.

In one embodiment, any of the different types of management messages may be packed in the same ATM cell. In this embodiment, the various lengths of the different message types must be accommodated without overrunning the packet boundary. Alternatively, the BS may be instructed to act on management messages which are contained within each packet; and the incomplete messages may be saved until the next packet addressed to the basic connection ID is received, at which time the management message may be reconstructed and acted upon. It is possible to then continue processing further management messages. This is not the preferred embodiment, however, due to the data management overhead imposed by a need to retain a partial message until the next message arrives.

Multi-Cell Packing

In embodiments where more than eight bandwidth request management messages are being sent by a CPE or base station, or where the total length of the various management messages exceeds 48 bytes, packing across multiple ATM cells may be performed as shown in FIG. 10. Such packing may be performed over any number of ATM cells, though it will commonly involve only two. In one embodiment, packing across multiple ATM cells is performed for each group of like management messages, which permits inclusion of the message type ID 502 into the header of the transporting packet; the message type ID may in this case be omitted from the payload. In another embodiment, mixed management messages may be packed in basic connection packets, each being implicitly identified as to length by the message type ID 502 with which it begins. For both such embodiments, packing may be selectively used by the wireless communication system 100 depending, for example, on the available bandwidth and/or processing headroom.

FIG. 10 illustrates an example of packing 10 bandwidth request messages 1000 into two ATM cells 1002a and b. A fill message 1004, which may be somewhat arbitrarily chosen to be for example 0xFF, is used to complete the payload of the second ATM packet. In this embodiment, the 8-byte space ordinarily used for the trailer from the first ATM packet is used for the bandwidth requests. The trailer message from the overall ATM packet is simply placed at the end of the fill 1004. Thus, a unique fill byte may indicate information which is to be ignored.

Alternatively, the length field of the MAC packet header may encompass only the actual management messages 1000, plus the space 1006 which does not contain a fall message, plus the management message 1008 contained in the second packet, plus the trailer 1010. In this alternative, the padding 1004 may follow the trailer. The receiving station may understand to simply process basic connection ID packets as they arrive, and to ignore any incomplete management messages, and to ignore any data following the trailer. However, this must be coordinated with the typical SAR function.

Thus, in embodiments where the SAR function causes the packed MAC management messages to be split across more than one ATM cell, MAC messages may start in one fixed length PDU and end in another. To ensure timely processing of MAC management messages, it is desirable to ensure that each fixed length PDU is fully self contained and does not rely on the receipt of the next PDU to complete processing. In one embodiment, the MAC management messages are fully contained within the fixed length PDU by using fill messages (e.g. fill byte=0xFF) to align an otherwise split MAC management message to the start of the next fixed length PDU.

Mapping of Management Messages to Physical Elements

In one embodiment, the base station low level media access arbitration (LL-MAA) performs the allocation and mapping of the available bandwidth of a physical channel based on the priority and quality of services requirements. Additionally, the availability of bandwidth is based on the modulation required to achieve acceptable bit error rate (BER), or to satisfy other signal quality indicia, between the base station and the individual CPEs. The base station MAC uses information from the physical protocol layer (PHY) regarding signal quality to determine the modulation required for a particular CPE and, therefor, the bandwidth that is available.

Once the base station LL-MAA has allocated uplink bandwidth to the CPEs, each CPE's LL-MAA, in turn, allocates that bandwidth to the uplink requests it has outstanding.

Figure 11:
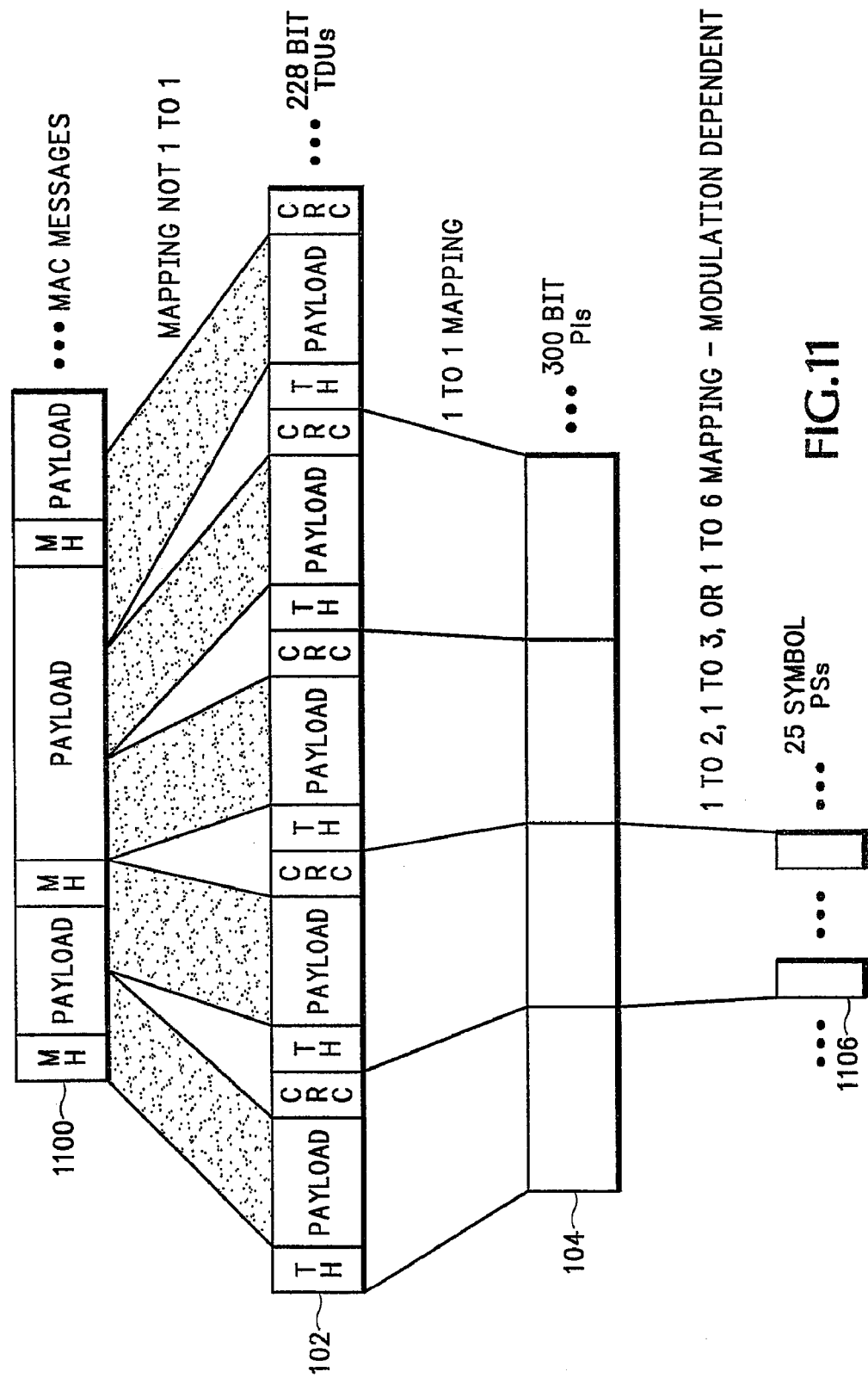
FIG. 11 illustrates packing variable length management messages into the 26 byte payloads of the Transmission Convergence Data Units (TDU), which map to a physical layer information elements (PI), and finally to physical layer slots (PS).

FIG. 11 shows one embodiment of how a stream of variable length MAC messages 1100 map to the 26 byte payloads of the Transmission Convergence Data Units (TDU) 1102, which map to PHY information elements (PI) 1104, and finally to physical layer slots (PS) 1106. In one embodiment, the minimum physical unit the LL-MAA allocates is the 25 symbol PS. In one embodiment, the minimum logical unit the LL-MAA allocates is the 208 bit (26 byte) payload of the 228 bit TDU. In one embodiment, Reed-Solomon coding is performed on the 228 bit TDUs to create the 300 bit PIs. In one embodiment, bandwidth needs that do not require Reed-Solomon coding, such as the various transition gaps, are allocated in units of 1 PS. Bandwidth needs that require Reed-Solomon coding are allocated in TDUs, with each modulation, on the downlink, and each CPE's transmission, on the uplink, padded to an integer multiple of TDUs to create an integer multiple of PIs. The number of PSs required to transmit a PI varies with modulation as mentioned previously.

Downlink Mapping of MAC to PHY

Figure 12:
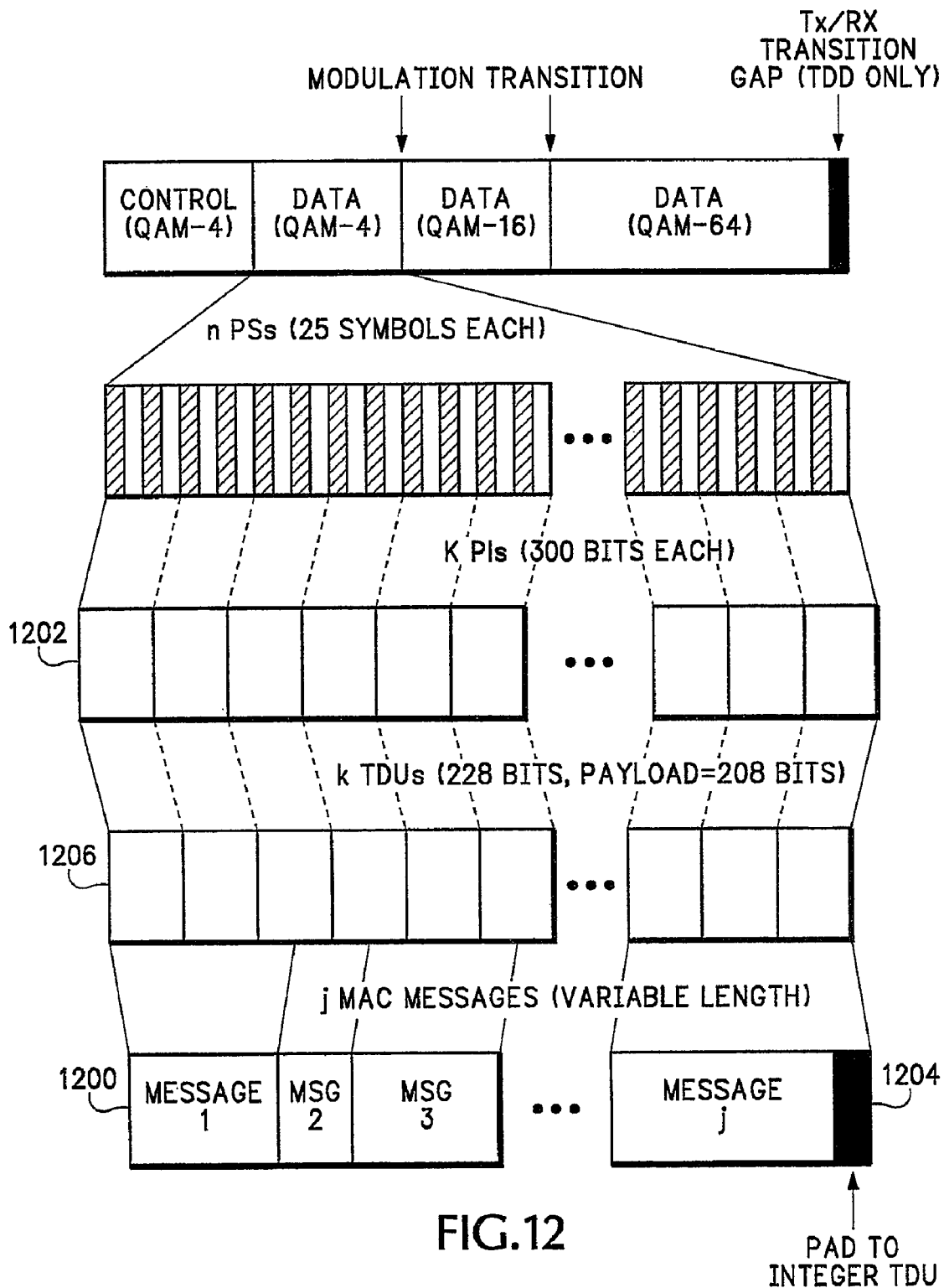
FIG. 12 shows a downlink mapping of management messages to physical layer information elements (PI).

FIG. 12 shows one embodiment of a downlink mapping of MAC messages 1200 to PHY information elements (PI) 1202. Within the subframe, Transmission Convergence/physical layer packets are grouped by modulation. In one embodiment, within the modulation blocks, the TC/PHY packets are grouped by CPE. In another embodiment the TC/PHY packets are not grouped by CPE. In one embodiment, all messages (other than in the frame header) for an individual CPE are transmitted with the same modulation. In one embodiment, each series of MAC packets at a particular modulation is padded 1204 to be an integer multiple of a TDU 1206 to provide an integer multiple of a PI 1202 after coding. In one embodiment, the padding uses the fill byte 0x55.

Uplink Mapping of MAC to PHY

Figure 13:
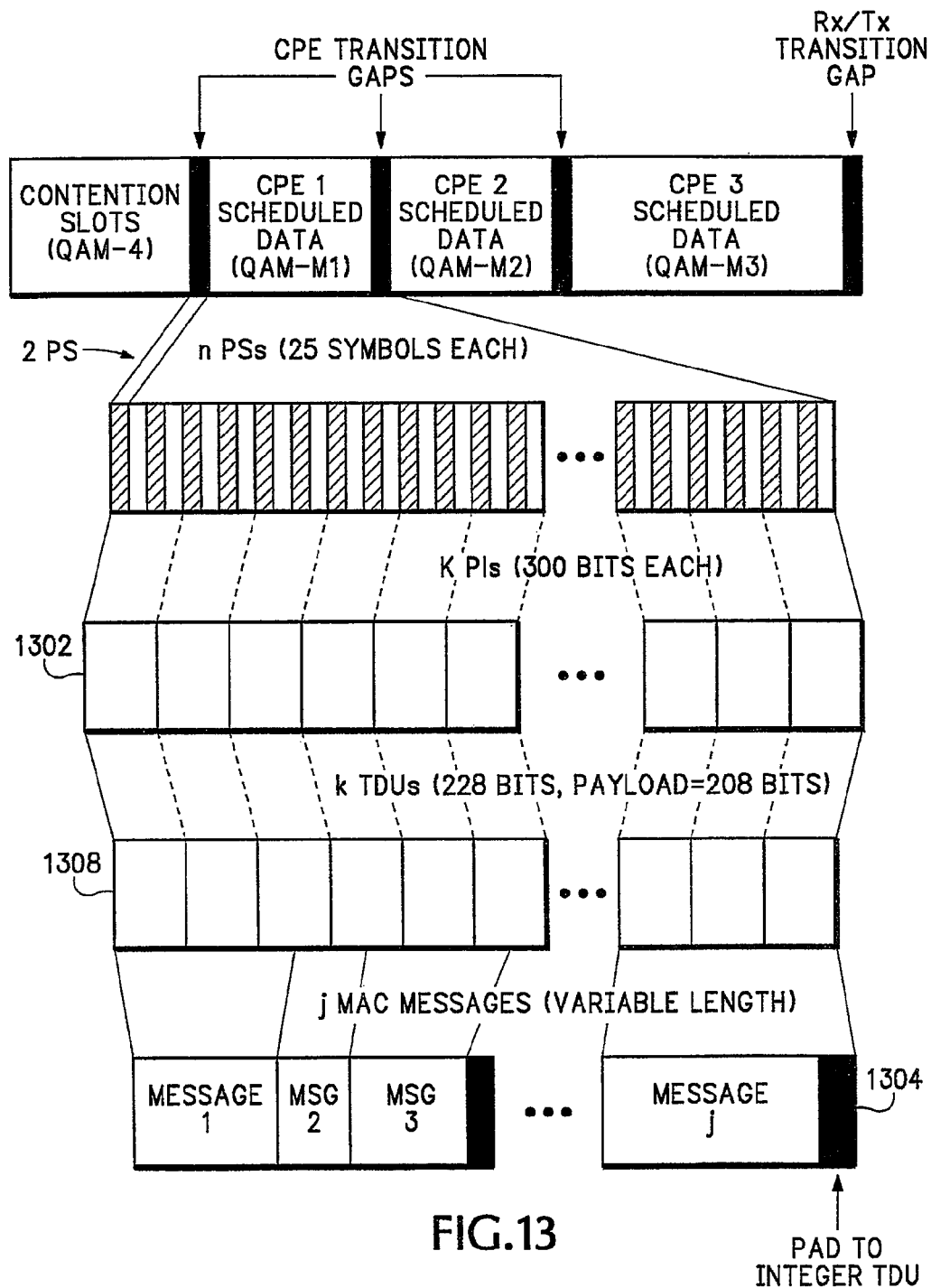
FIG. 13 shows an uplink mapping of management messages to physical layer information elements (PI).

FIG. 13 shows an uplink mapping of management messages to PHY information elements (PI) 1302. In this embodiment, the CTG 1304 contains a 1 PS preamble to ensure synchronization with the new CPE. As mentioned above, in one embodiment, the TC/PHY packets within the subframe are grouped by CPE. In one embodiment, all messages (other than bandwidth requests transmitted in bandwidth request contention slots) from an individual CPE are transmitted with the same modulation. In one embodiment, each CPE's transmission is padded to be an integer multiple 1306 of a TDU 1308 to provide an integer multiple of a PI 1302 after coding. In one embodiment, the padding uses the fill byte 0xFF.

Methods for CPE Transmission of Bandwidth Request Management Message

One method available to a CPE to transmit a bandwidth request uses a "polling" technique whereby a base station polls one or more CPEs and allocates bandwidth specifically for the purpose of allowing the CPE(s) to transmit bandwidth requests. In accordance with this method, the polling of CPEs by the base station may be in response to a CPE setting a "poll-me bit" in the uplink, or it may be periodic at a rate which may vary with usage level. Periodic polls may be made to individual CPEs (referred to as "reservation-based" polling), to groups of CPEs ("multicast" polling), or to every CPE on a physical channel ("broadcast" polling). In reservation-based polling, the base station polls an individual CPE and then allocates uplink bandwidth to allow the CPE to respond with a bandwidth request in the form of a management message. Similarly, in multicast and broadcast polling, the base station polls several CPEs and then allocates uplink bandwidth to allow the CPEs to respond with a bandwidth request in the form of a management message.

Similar to the individual polling technique described above, the multicast polling message is not explicitly transmitted by the base station to CPEs. Rather, the multicast poll message is implicitly transmitted to a plurality of CPEs when the base station allocates bandwidth in the uplink sub-frame map. However, rather than associating allocated bandwidth with a CPE's basic connection ID as done when performing an individual poll, the base station associates the allocated bandwidth to a multicast or broadcast connection ID.

Another method for reducing the bandwidth consumed by management message requests is the technique of "piggy-backing" management messages, single cell or multi-cell, on bandwidth allocated to a CPE. In accordance with this technique, currently active CPEs send management messages using previously unused portions of uplink bandwidth that is already allocated to the CPE. The necessity for the BS to poll such active CPEs is thereby eliminated. Alternatively, management messages are piggybacked on uplink bandwidth allocated and actively being used by a data service. In accordance with this alternative, the CPE "steals" bandwidth already allocated for a data connection by inserting management message requests in time slots previously intended for data. Thus, the CPEs have a number of different techniques available to them for communicating management messages to their associated base stations.

Aspects of the present invention have been disclosed in one or more exemplary embodiments. These embodiments are not to be construed as limiting, but rather as showing a way to practice the invention. The scope of the invention is defined by the claims which follow.

What is claimed is;

1. An apparatus comprising:
   a transmitter to transmit data to a base station for a plurality of connections, and the data being transmitted in packets over one or more of a plurality of channels shared with at least one other apparatus communicating with the base station;
   a receiver to receive from the base station a plurality of packets having a plurality of management messages greater in number than a number of packets, the greater number of management messages being packed into the less numerous number of packets, and including a management message instructing the transmitter to switch transmission of the data between said plurality of connections and said base station from a first of the plurality of shared channels to a second of the plurality of shared channels, the second shared channel being less congested than the first shared channel; and
   a control module coupled to the transmitter and the receiver to respond to the management message and cause the transmitter to switch from the first shared channel to the second less congested shared channel.

2. The apparatus of claim 1, wherein said plurality of shared channels are adapted for transmitting information between said plurality of connections and said base station in a sector defined by said base station.

3. The apparatus of claim 1, wherein at least some of said plurality of packets each comprises a connection identifier associating the packets with said connections, and wherein a packet comprising said management message instructing the transmitter to switch comprises a special connection identifier.

4. The apparatus of claim 3, wherein said control module is further configured to:

unpack said instructing management message from the packet comprising said special connection identifier; and cause the transmitter to switch to the second less congested shared channel in response to unpacking said instructing management message from the pack comprising said special connection identifier.

5. A method comprising:

facilitating, by a CPE station, transmitting of data between a plurality of connections and a base station in a wireless communication link over a plurality of shared channels;

receiving a plurality of packets including a plurality of management messages from the base station, a number of management messages in the plurality of packets being more numerous than a number of packets, the more numerous management messages being packed in the less numerous packets, and including at least one management message instructing said CPE station to switch transmitting data between said plurality of connections and said base station from a first of said plurality of shared channels to a second of said plurality of shared channels, the second shared channel being a less congested shared channel than the first shared channel; and in response to the switch instructing management message, causing said CPE station to switch transmitting from the first shared channel to the second less congested shared channel.

6. The method of claim 5, wherein said plurality of shared channels are adapted for transmitting information between said CPE station and said base station in a sector defined by said base station.

7. The method of claim 5, wherein at least some of said packets each comprises a connection identifier associating the packets with said connections, and wherein packets comprising said switch instructing management message comprise a special connection identifier.

8. A system comprising:

one or more base stations configured to transmit information to a subscriber station to provide services to subscribers associated with subscriber stations, said subscriber station being configured to transmit data between a plurality of connections associated with the subscribers and said one or more base stations over a plurality of shared channels, at least one of said base stations configured to:

detect congestion on at least a first of said plurality of shared channels;

transmit a plurality of packets including a plurality of management messages to at least one subscriber station, a number of management messages being more numerous than a number of packets, the more numerous management messages being packed into the less numerous packets, and including at least a management message instructing the at least one subscriber station to switch from transmitting on the first shared channel to transmit on a second of said plurality of shared channels, the second shared channel being a less congested shared channel than the first shared channel.

9. The system of claim 8, wherein the base station is further configured to include a special connection identifier associating one of said plurality of packets as having said management message having the instruction to switch.

10. The system of claim 9, wherein said at least one subscriber station is further adapted to:

unpack the plurality of management messages from the plurality of packets, including the management message from the packet comprising said special connection identifier; and commence the switch from transmitting data to said base station on said first shared channel to transmitting data on said second less congested shared channel in response to unpacking said management message from the packet having the special connection identifier.

11. The system of claim 8, wherein said plurality of shared channels are adapted for transmitting information between said subscriber station and said base station in a sector defined by said base station.

12. The system of claim 8, wherein said base station further comprises a sectored antenna array.

13. The system of claim 8 further comprising a communication hub coupled to said one or more base stations by a back haul, said communication hub comprising a switch adapted to provide Internet access to one or more of the plurality of connections.

14. An apparatus comprising:

means for transmitting data to a CPE station in a wireless communication link over a plurality of shared channels;

means for detecting a level of congestion on at least some of said plurality of shared channels; and means for transmitting a plurality of packets having a plurality of management messages more numerous than a number of packets, the more numerous management messages being packed in the less numerous packets, and including a management message instructing said CPE station to switch transmission between a plurality of connections and a base station from a first of the plurality of shared channels to a second of the plurality of shared channels, the second shared channel being less congested than the first shared channel.

15. The apparatus of claim 14 wherein the packet having the management message instructing the CPE station to switch transmission further comprises a special connection identifier identifying the packet as having the switch instructing management message.

* * * * *